United States Patent
Lussier

[11] 4,107,824
[45] Aug. 22, 1978

[54] CLAMPING COLLAR

[75] Inventor: Michel Lussier, Vichy, France

[73] Assignee: Automobiles Peugeot and Hautrifil, Paris, France

[21] Appl. No.: 793,297

[22] Filed: May 3, 1977

[30] Foreign Application Priority Data

May 3, 1976 [FR] France .................................. 76 13151

[51] Int. Cl.² ............................................ B65D 63/10
[52] U.S. Cl. ............................................ 24/27; 24/256
[58] Field of Search ............ 24/27, 256, 20 TT, 20 S, 24/20 R, 257, 261 R, 255 SL, 237, 72

[56] References Cited

U.S. PATENT DOCUMENTS

| 503,683 | 8/1893 | Robertson | 24/72 |
| 1,419,408 | 6/1922 | Polhemus | 24/27 UX |
| 2,816,338 | 12/1957 | Klaucnik, Jr. | 24/27 |
| 3,132,396 | 5/1964 | Berman | 24/27 |
| 3,543,353 | 12/1970 | Meehan | 24/16 PB |
| 3,604,066 | 9/1971 | Moon | 24/256 X |

*Primary Examiner*—Andrew V. Kundrat
*Attorney, Agent, or Firm*—Burns, Doane, Swecker & Mathis

[57] ABSTRACT

The collar comprises a wire of elastically yieldable material forming a coil. Two opposite end portions of the coil each comprise hooking means and, between the coil and the hooking means, an intermediate bent portion. The curvature of each bent portion is opposed to the curvature of the corresponding end portion of the coil.

2 Claims, 6 Drawing Figures

CLAMPING COLLAR

The present invention relates to a clamping collar adapted to fix a more or less flexible tubular element to a more or less rigid tubular element.

Clamping collars exist which are formed by a metal wire constituting a coil the opposite ends of which are bent in such manner as to be capable of hooking onto each other.

These collars have several drawbacks:

They must have a dimension which is well adapted to the dimension of the tubular element on which they are mounted.

They do not permit compensating for a possible sinking in of the surface of the tubular element over a period of time, owing to the fact that they do not have a compensating means.

They have a discontinuity in their clamping action in the region of the hooking together of the ends of the coil, with the risk of a pinching of the flexible tubular element upon assembly.

An object of the present invention is to overcome these various drawbacks.

The invention therefore relates to a clamping collar constituted by a wire forming a coil the opposite end portions of which comprise hooking means.

In this collar, each end portion comprises beyond said coil an intermediate bent portion between the coil and the hooking means, the curvature of each bent portion being opposed to that of the corresponding end portion of the coil.

One embodiment will now be described hereinafter with reference to the accompanying drawings in which.

The illustrated collar comprises a coil 1 which forms at rest a complete circle with preferably a slight overlapping.

Each end portion of the coil has, beyond the latter, a bent portion 2a, 2b, having a curvature which is opposed to the curvature of the corresponding end portion and terminates in a loop 3a, 3b whose end portion 4a, 4b is, in the free position, bent toward the side opposed to the neighbouring end portion of the coil.

Figure 1:
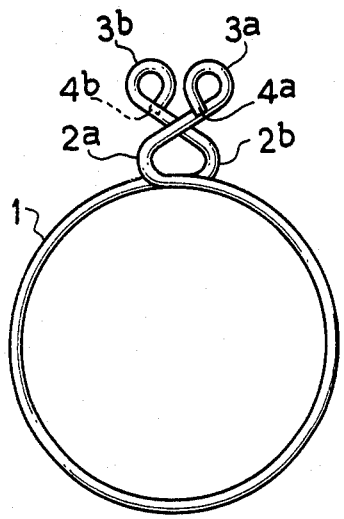
FIG. 1 is a front elevational view of the collar in the free position.
Figure 2:
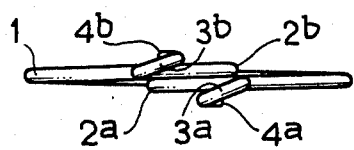
FIG. 2 is a top plan view of the collar shown in FIG. 1.
Figure 5:
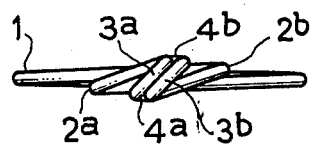
Figure 3:
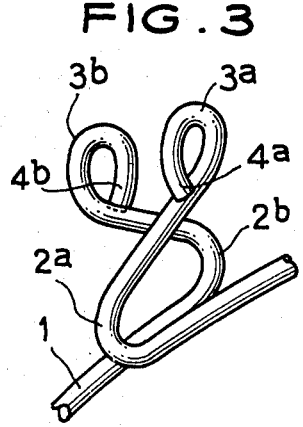
FIG. 3 is a partial perspective view of the collar shown in FIG. 1.
Figure 6:
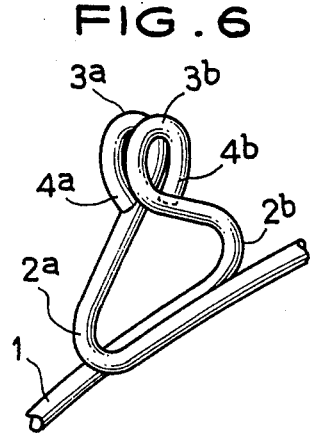
FIG. 6 is a partial perspective view of the collar shown in FIG. 4.

In the free position, shown in FIGS. 1 to 3, the loop 3a is in front of the loop 3b and the end portion 4a and 4b of the two loops are disposed on each side of the two end portions of the coil and therefore cannot come into contact with each other.

Figure 4:
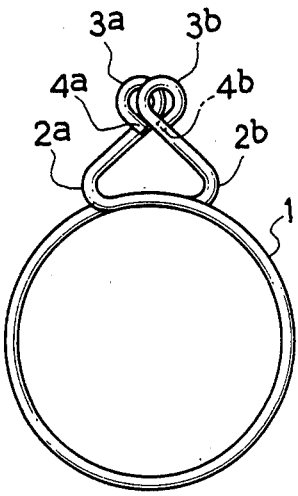
FIGS. 4 and 5 are views similar to FIGS. 1 and 2 of the collar in the closed position.

In the closed position obtained by passing the loop 3a behind the loop 3b (FIG. 4), the loops 3a, 3b are engaged on each other in such manner that, owing to the return force exerted by the bent portions 2a and 2b on the corresponding loops and owing to the fact of the tendency of the loops 3a and 3b to resume their initial positions, the loop 3a bears on the end portion 4b of the other loop and vice-versa.

In this way, a good hooking is achieved, whereas the intermediate loop formed by the two bent portions 2a, 2b ensures, by its elasticity, a good clamping on the tubular element to be fixed.

Owing to this elasticity, one is no longer limited by the precision of fabrication of the collar and it is even possible to provide a single collar for tubular elements of slightly different diameters.

This elasticity permits maintaining a permanent clamping, even if the tubular element undergoes a slight contraction over a period of time.

The clamping is perfectly distributed throughout the length of the coil.

Owing to the fact that the coil 1 forms a complete circle, even in the free position, there is no danger of a pinching of the flexible tubular element or any risk that a slight nose be formed in the region of the junction zone to the detriment of the sealing qualities.

Having now described my invention what I claim as new and desire to secure by Letters Patent is:

1. A clamping collar comprising a wire of elastically yieldable material forming a coil which has neighbouring end portions each of which end portions comprises hooking means and, beyond said coil, an intermediate bent portion between the coil and the hooking means, the curvature of each bent portion being opposed to the curvature of the corresponding end portion of the coil, and said hooking means are constituted by an end closed loop portion extending each one of the intermediate bent portions, each loop portion having an end portion which is bent, in the free position of the collar, to a side of its corresponding end portion of the coil opposite to the neighbouring end portion of the coil.

2. A clamping collar as claimed in claim 1, wherein, in the closed position of the collar, one of the loop portion end portions is engaged behind the other loop end portion and, under the effect of the return force exerted by the intermediate bent portions, said one of the loop portion end portions bears against the end portion of said other loop portion and vice versa.

* * * * *